July 14, 1942.　　　　J. J. THOMPSON　　　　2,289,529
INNER PUFFED CEREAL
Filed Aug. 12, 1940
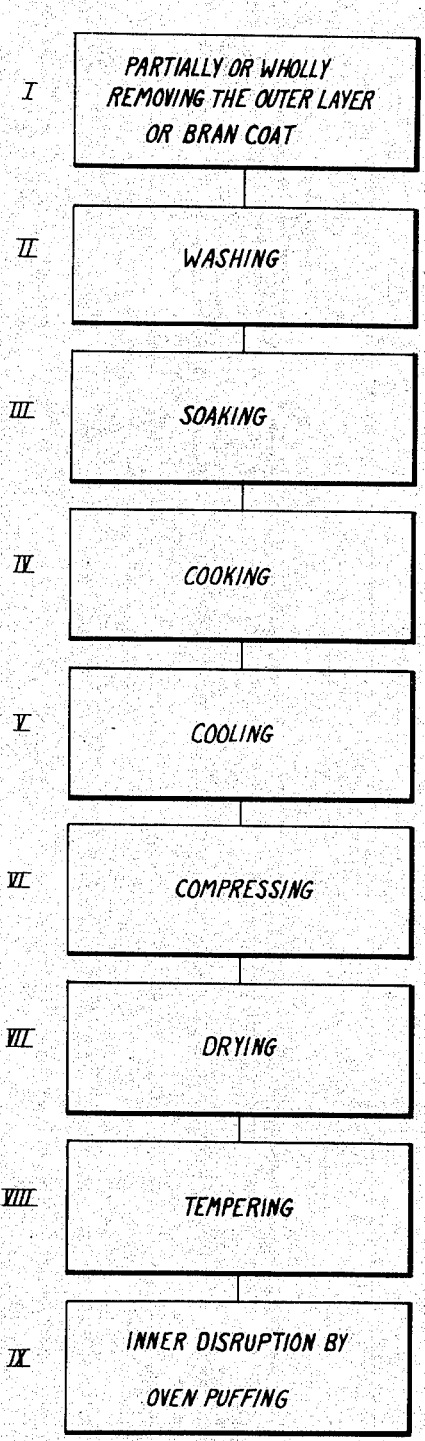
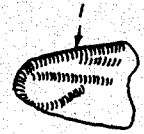
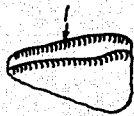
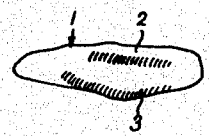
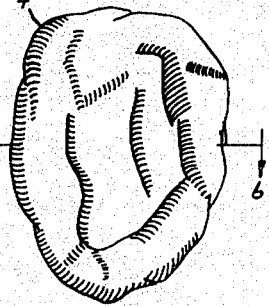
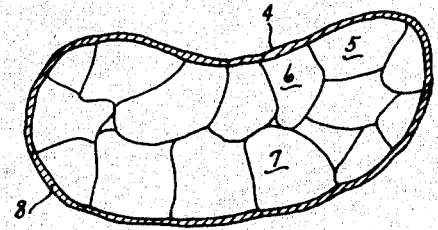
INVENTOR
JOSEPH J THOMPSON
BY
ATTORNEY Patented July 14, 1942

2,289,529

UNITED STATES PATENT OFFICE 2,289,529

INNER PUFFED CEREAL

Joseph J. Thompson, Battle Creek, Mich., assignor to Kellogg Company, Battle Creek, Mich., a corporation of Delaware Application August 12, 1940, Serial No. 352,193

9 Claims. (Cl. 99—81)

It is the object of this invention to provide a new cereal food, that is, an inner puffed cereal produced in an oven.

Heretofore, all types of puffed cereals produced in an oven made a puff or series of puffs or blisters on the outer surface of the cereal. The process of this application results in a new product in which the puffs are internal with a relatively smooth surface on the outside of the product.

It is the object of this process to produce such a product from such cereals as maize, wheat and the like in which there is a relatively even outer shell within which the puffing takes place thereby providing a product that is crisp, that will remain crisp in milk or cream for a considerable period and which will be capable of being shipped with a minimum of damage due to the fact that the delicate puffs are on the inside of the cereal and not on the exterior where they can become broken and damaged. It is a further object to secure this product from cooked and flavored grain which hitherto has not been possible.

One of the accomplishments of this invention is to provide a grain that has a case hardened outer surface that is substantially smooth and relatively hard which is impervious to moisture in milk and cream so that the grains do not become rubber-like, sticky and gelatinous when placed in the presence of milk or cream; but which grains have a delicate internal structure consisting of the thin fragile separating walls between expanded cells so that when the grain is broken by the teeth the external impervious coating disintegrates readily in the mouth and the cell walls more easily disintegrate due to the fact that they are readily dissolvable. In this manner it is possible to produce a cereal that can be eaten with milk or cream without becoming waterlogged with moisture and at the same time will be crisp in the mouth without being tough and will readily dissolve into minute particles without the necessity of chewing.

Referring to the drawing:

Figure 1 illustrates diagrammatically a flow sheet designating the successive steps in the process;

Figure 2 is a side elevation of a grain of maize prior to the practice of this process upon the maize;

Figure 3 is a side elevation thereof;

Figure 4 is a side elevation thereof after the grain has been flattened due to the compressing step;

Figure 5 is a plan view of the grain after the process has been completed;

Figure 6 is a section on the line 6—6 of Figure 5.

Referring to the drawing in detail the process set forth herein has for its object to produce an inner-disrupted smooth exterior surface, flavored, cooked and oven puffed, ready to eat, cereal product, prepared from that part of the maize grain known to the industry and trade as "grits."

This inner-disrupted product differs from the gun-puffed products prepared from the uncooked and whole grain and from the oven-puffed class of cereals wherein puffing is accomplished by a disruption of the exterior surface of the grain, whereas in the present instance the exterior surface of the grain is not disturbed, it is retained and strengthened and the puffing takes place substantially internally of the grain.

Referring to the process flow sheet of Figure 1 it will be noted that the major steps are partially or wholly removing the outer layers or bran coat, washing the "grits," soaking it to produce ultimately the substantially even outer shell, cooking it, cooling it, compressing it to flatten it as in Figure 4, drying it, tempering it and then placing it in an oven to bring about the inner puffing within the shell.

It will be understood that this invention is applicable for the process of the expanding of cereal grains such as wheat, maize, rice, rye, etc. and that the resulting expanded cereal grain product is unique in that the puffing is internal with a relatively smooth exterior.

In Figure 2 the grain 1, which is known to the trade as a "grit," is flattened slightly as shown in Figure 4 with the upper and lower flattened surfaces 2 and 3. This is brought about by passing between spaced rolls.

The resulting product of this process is a relatively flat or slightly deformed product that is very much enlarged. Its exterior surface, as at 4, is relatively smooth, i. e., it is not deformed with a series of protruding blisters as in the case of previous products, whether gun-puffed or oven-puffed. To the contrary the blisters 5, 6, 7, etc. are all internal. The grain expands to form a crisp body with crisp partitions forming the cells substantially wholly within the interior of the grain. This gives a light, crisp product with a relatively heavier external surface or shell 8. This gives a strong product that will not interiorate in shipping, that easily retains its crispness in cream or milk but disintegrates in the mouth. It has no elements of stickiness or rubber-like quality which has been characteristic of puffed maize in the past, but to the contrary has the fragile, delicate structure and taste that is desired in an eatable cereal.

EXAMPLE I: Maize

1. Washing the "grits."
2. Soaking the "grits" in a solution containing salt, salt and sucrose, or salt and any other flavoring materials.

The concentration of the salt or salt and sucrose, flavoring material, etc. may vary from 5% to 20%. The temperature of the solution during the soaking period may range from 70° F. to 190° F.

The time during which the maize is soaked may vary from 2 hrs. to 24 hrs.

3. Cooking the soaked maize "grits" in live steam.

Cooking of the "grits" is accomplished in a rotary cooker, which is standard equipment in the cereal industry.

The pressure of the live steam in the cooker may vary from 7 lbs. (gauge) per square inch to 45 lbs. (gauge) per square inch.

The time of cooking may vary from 15 min. to 1.5 hours according to load and steam pressure.

4. Cooling the cooked maize "grits."
5. Passing the cooked and cooled maize "grits," at approximately 28-35% moisture content, through smooth flaking rolls, so adjusted as to slightly compress and deform the "grits."
6. Drying the deformed "grits" to 8-12% moisture content.

The temperature during drying may vary from 70° F. to 150° F.

7. Holding the dried, deformed "grits" at 70°-80° F. from 6 hours to an indefinite period.
8. Inner-disrupting the dried, deformed and held maize "grits," by subjecting to a temperature ranging from 500° F. to 600° F.

EXAMPLE II: Wheat

1. Washing the grain after partial or total removal of the outer layer or bran coat, or direct No. 2.
2. (a) Soaking the grain in a solution containing salt with sugar, or with salt sugar and malt extract or with any other flavoring constituents, together with salt.

(b) Soaking the grain in a solution containing only salt.

(c) Soaking the grain in a solution containing any substance that will so modify the grain proteins as to allow puffing.

Solution temperatures during soaking ranging from 50° F. to 150° F. for 2 to 7 hours periods. Higher temperatures requiring even shorter times.

3. After soaking (a) Allowing the grain to modify by holding for a period of from 12-30 hours at temperatures ranging from 50° F. to 90° F. before beginning No. 4.

(b) Beginning No. 4 immediately.

4. Drying the soaked wheat at a temperature ranging from 80° F. to 150° F., to a moisture content of from 28-32%.
5. Cooking the dried wheat at 40 lbs. gauge steam pressure, in live steam for 10-15 minutes or as necessary for quantity of grain used.
6. Cooling the cooked grain to 80° F. or thereabout.
7. Passing the cooked and cooled grain at approximately 30% moisture content through smooth flaking rolls, so adjusted as to slightly compress and deform the grain by slightly flattening each berry.
8. Drying the slightly flattened grain at temperatures ranging from 70° F. to 110° F. to a moisture content of around 10%.
9. Holding the dried flattened grain for 6-15 hours or more if dried at 110° F., if dried at 70° F., no necessity for holding.
10. Puffing the dried flattened grain by subjecting to a temperature of 490°-1500° F.

EXAMPLE III: Wheat

Three thousand grams of Durum wheat, having the bran coating partially removed, was placed in a solution held at 184° F., said solution consisting of 4500 cc. water and 300 g. of salt. After placing the wheat in the solution the temperature dropped to 150° F. at which temperature the solution was maintained for 2 hours. After 2 hours the wheat was removed from the solution and held at approximately 80° F. for 19 hours then dried for 19 minutes at 110° F. and cooked for 12 minutes at 40 lbs. gauge pressure, in live steam. After cooking, the wheat was cooled for 1½ minutes at 94° F. and slightly flattened by passing it through flaking rolls so adjusted as to slightly compress each berry, then the wheat was dried 1¼ hours at 110° F. and 4¼ hours at 90° F., held for 15 hours and puffed at a temperature of 490° F.

The weight of a 524 package was 6 ounces.

EXAMPLE IV: Wheat

Three thousand grams of Durum wheat, having the bran coating partially removed, was placed in a solution held at 184° F., said solution consisting of 4500 cc. water, 270 g. of sucrose, 250 g. salt. After placing the wheat in the solution the temperature dropped to 149° F., at which temperature the solution was maintained for 4 hours, after which time the wheat was removed from the solution, dried for 20 minutes at 110° F. and cooked. The cooked wheat was cooled 2½ minutes at 97° F. and slightly flattened by passing through flaking rolls, then dried 3¼ hours at 110° F., held 12 hours, and then puffed at 490°-500° F.

The weight of a 524 package of the finished product was 6⅛ ounces.

It will be understood that I desire to comprehend within my invention such modifications as come within the scope of the claims and invention.

Having thus fully described my invention what I claim as new and desire to secure by Letters Patent is:

1. In a method of producing a serial product with a relatively smooth exterior surface and inner puffs of greatly enlarged structure compared to its original condition, the step (a) of soaking the grits in a solution containing 5 to 20% salt to the amount of liquid used; the step (b) of cooking the soaked grits; the step (c) of compressing the cooked grits to change the physical form thereof; and the step (d) of oven toasting the deformed grits to produce an internally puffed product with a relatively smooth exterior.

2. In a method of producing a cereal food product comprising a relatively smooth external surface and inner puffs, comprising the step (a) of soaking the cereal grits in a salt solution consisting of 5 to 20% salt to the amount of liquid used to case harden the grit; the step (b) of cooking the grits in live steam; the step (c) of deforming the grits; the step (d) of drying the deformed grits to a predetermined moisture content; the step (e) of tempering the grits by holding them at a predetermined temperature for a period; and the step (f) of subjecting the grits to such a temperature as to cause the deformed grits to swell forming internal puffs without disrupting the exterior of the grit or forming blisters thereon.

3. In a method of preparing an inner-disrupted, oven-puffed, maize product, the step (a) of washing the grits; the step (b) of soaking the grits in a solution containing 5 to 20% salt to the amount of liquid used containing salt and other flavoring materials in a concentration of from 5 to 20% at a temperature from 70° F. to 190° F. from 2 hours to 24 hours; the step (c) of cooking the soaked maize grits in live steam from 7 lbs. gauge pressure per square inch to 45 lbs. gauge pressure per square inch from 15 minutes to 1½ hours; the step (d) of cooling the cooked maize grits; the step (e) of passing the cooked and cooled maize grits, at approximately 28 to 35% moisture content through flaking rolls adjusted so as to slightly compress and deform the grits; the step (f) of drying the deformed grits to 8 to 12% moisture content at a temperature of 70° F. to 150° F.; the step (g) of holding the dried, deformed grits at 70° F. to 80° F., for not less than 6 hours to temper them; and the step (h) of internally disrupting the dried, deformed maize grits by subjecting them to a temperature ranging from 500° F. to 600° F.

4. In a method of manufacturing a puffed cereal grain from which the outer layer or bran coating has first been partially or totally removed, comprising the step (a) of washing the grain; the step (b) of soaking the grain in a solution containing 5 to 20% salt to the amount of liquid used containing a salt material, that will modify the grain proteins so as to allow puffing; the step (c) of drying the grain to a moisture content of from 28 to 32%; the step (d) of cooking the dried grain in live steam; the step (e) of cooling the grain to approximate room temperature; the step (f) of slightly compressing and deforming the grain by slightly flattening; the step (g) of drying the grain to approximately 10% moisture content; and the step (h) of puffing the dried flattened grain by subjecting it to a temperature of 490° F. to 1500° F.

5. In a method of producing a cereal product with a substantially smooth exterior and an enlarged puffed interior as compared with the size of the original grain, comprising the step (a) of soaking the grain in a solution containing 5 to 20% salt to the amount of liquid used containing a salt material that will so modify the grain proteins as to form an outer coating that will remain smooth despite subsequent internal puffing; the step (b) of cooking the soaked grain; and the step (c) of puffing the grain by subjecting it to a temperature of from 490° F. to 1500° F.

6. In a method of producing a cereal product with a substantially smooth exterior surface and an enlarged puffed interior as compared with the size of the original grain, comprising the step (a) of soaking the grain in a solution containing an amount of 5 to 20% salt to the liquid used that will so modify the grain proteins as to form an outer coating that will remain smooth despite subsequent internal puffing; the step (b) of cooking the soaked grain; the step (c) of physically modifying the thickness of the grain to mechanically deform it internally; the step (d) of controlling the moisture content before and after mechanically deforming; and the step (e) of puffing the flattened grain to cause internal puffs without substantially deforming the exterior of the grain.

7. In a process of puffing cereals, the step (a) of modifying the proteins in the exterior portion of a grit by soaking with salt consisting of 5 to 20% salt to the amount of liquid used; the step (b) of cooking the grit to convert the starches and dextrinize or modify the polysaccharides in the grain to cause case hardening of the grain; and the step (c) of causing absorbed moisture in said grain to expand in the form of steam upon the heating of the grain to form cells within the grain without disrupting the case hardened exterior of the grain.

8. In a method of puffing cereals, the step (a) of soaking in salt solution consisting of 5 to 20% salt to the amount of liquid used to modify the exterior proteins of the grain; the step (b) of cooking the grain in dry steam in order to convert the starches in the grain and modify the polysaccharides in order to provide a case hardened structure of said grain; the step (c) of structurally deforming the grain mechanically without disrupting the exterior case hardened portion thereof; and the step (d) of toasting to cause the absorbed moisture on the interior of the grain to form cells through the expansion of steam in the grain without disrupting the case hardened shell of the grain.

9. A cereal food comprising a cereal grain having a case hardened outer shell having salt dispersed throughout said case hardened outer shell, said shell being substantially impervious to moisture, said shell having a substantially smooth and relatively hard moisture impervious outer surface, and an inner expanded structure with fragile separating walls between cells therein, said cell walls being readily impervious to moisture.

JOSEPH J. THOMPSON.